United States Patent [19]

Zenner et al.

[11] 4,233,321

[45] Nov. 11, 1980

[54] WHITE PAN BREAD AND ROLL PROCESS AND PRODUCT

[75] Inventors: Sylvester F. Zenner, Memphis, Tenn.; Daniel C. Stanberry, Mission Viejo, Calif.

[73] Assignee: Patent Technology, Inc., San Francisco, Calif.

[21] Appl. No.: 954,644

[22] Filed: Oct. 25, 1978

Related U.S. Application Data

[63] Continuation-in-part of Ser. No. 834,808, Sep. 19, 1977, abandoned, which is a continuation of Ser. No. 722,218, Sep. 10, 1976, abandoned.

[51] Int. Cl.$^3$ ..................... A21D 13/00; A21D 15/00
[52] U.S. Cl. ...................................... 426/19; 426/549
[58] Field of Search ................................ 426/18–26, 426/551–554, 549

[56] References Cited

PUBLICATIONS

Guy, "Lactose-Review of its Properties and Uses in Bakery Products," *The Baker's Digest*, Apr. 1971, pp. 34–36, 38 & 74.
Chemical Abstract, vol. 78, 1973, p. 378, Item 28134f.
Chemical Abstract, vol. 71, 1972, p. 313, Item 11266tu.
Reger, "New Aspects of an Old Sugar-Lactose," *Cereal Science Today*, vol. 3(10), Dec. 1958, pp. 270–272.

*Primary Examiner*—Raymond N. Jones
*Assistant Examiner*—Elizabeth A. Hatcher
*Attorney, Agent, or Firm*—Flehr, Hohbach, Test, Albritton & Herbert

[57] ABSTRACT

White pan bread and rolls characterized by significantly prolonged shelf-life are produced by replacing 10 to 50% of the sugar and fat content of standard dough formulations for such bakery products with lactose. Specifically, lactose is used to replace 10 to 50% of the sugar or corn sugar content (sucrose, dextrose) or fat content (shortening) or both, in such standard formulations containing as a norm, on the weight of the flour, 6 to 12% sugar and 2.5 to 8% fat (white pan breads: 6–10% sugar, 2.5–3.5% fat; rolls: 10–13% sugar, 6–8% fat). Shelf-life of the improved bread and rolls, which is related to the tenderness or "freshness" of the baked products, is prolonged 50 to 100%, or longer, as compared to the shelf-life of standard formulation white pan breads and rolls. Substantially increased volumes and external appearance scores are also obtained in comparison with said standard formulation products.

5 Claims, 4 Drawing Figures

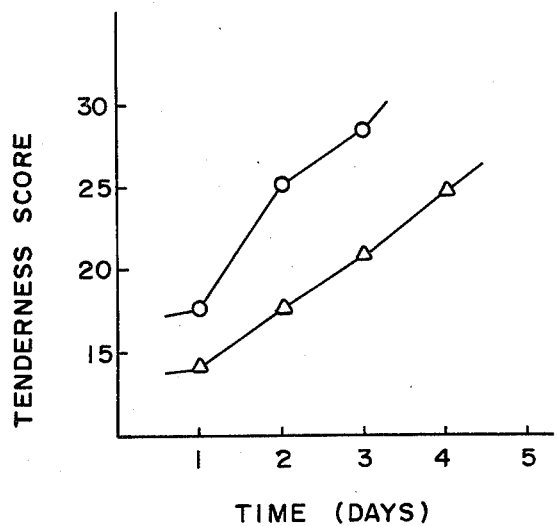
FIG.—1
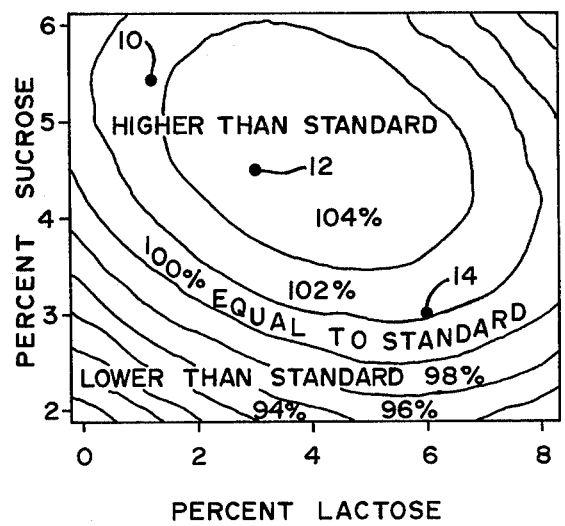
FIG.—2
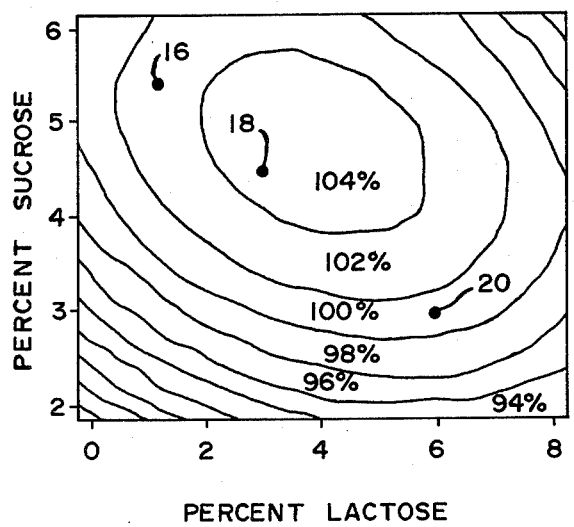
FIG.—3
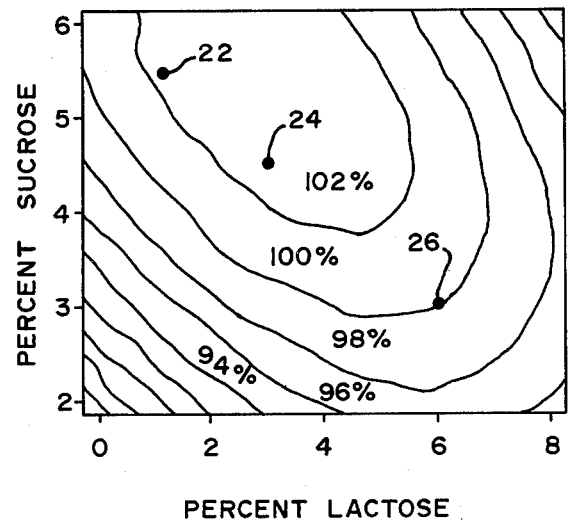
FIG.—4

WHITE PAN BREAD AND ROLL PROCESS AND PRODUCT

CROSS REFERENCE TO RELATED APPLICATION

This application is a continuation-in-part of our copending application Ser. No. 834,808, filed Sept. 19, 1977, which is a continuation of our previously filed application, Ser. No. 722,218, filed Sept. 10, 1976, both now abandoned.

BACKGROUND OF THE INVENTION

This invention relates to white pan bread and rolls as found in supermarkets and like retail outlets in the United States. Such bakery products including specifically white pan bread (which accounts for 79% of all bread made in the United States)[1] are predominently made by either the sponge-dough or the continuous method. Standardized formulas for white pan bread as prepared by such methods, and also by the straight dough and the so-called "no-time" dough procedures, are set forth in the following table.

1. "Wheat Chemistry and Technology", Y. Pomeranz, American Association of Cereal Chemists, 1964, Page 676.

TABLE 1

"STANDARDIZED" WHITE BREAD FORMULAS

|  | Straight[1,2] | Sponge/Dough[1] | Continuous[2] | No-Time[3] |
|---|---|---|---|---|
| Flour | 100 | 100 | 100 | 100 |
| Water | 65 | 65 | 67 | 60 |
| Yeast | 3.0 | 2.5 | 3.25 | 3.0 |
| Yeast Food | 0.2–0.5 | 0.2–0.5 | 0.75 | 0.5 |
| Salt | 2.25 | 2.25 | 2.0 | 1.75 |
| Sugar | 8–10 | 8–10 | 7.0 | 5.8 |
| Fat | 3.0 | 3.0 | 3.0 | 3.0 |
| Milk Solids | 3.0 | 3.0 | 2.0 | 2.0 |
| Softener | 0.2–0.5 | 0.2–0.5 |  |  |

Authority:
[1] "Wheat Chemistry and Technology", Y. Pomeranz, American Association of Cereal Chemists, 1964, Page 676.
[2] "The Bakers Digest", J. Moncrieff and A. G. Oszlanyi, August, 1970, Page 44.
[3] "The Bakers Digest", L. Smerak, August, 1973, Page 12.

While virtually every authority will preface a review of a "standard" formulation by saying that some minor modification or variation of ingredient proportion is to be expected at each locality or plant (depending on the flour used, type of bread desired and other factors), the formulations are surprisingly similar, particularly with respect to the two key ingredients: sugar and fat. Thus, the proportion of sugar in the standard formulation for white pan bread is within the range from 6 to 10% on the weight of the flour, whereas the proportion of fat or shortening is close to 3%, ranging from about 2.5 to 3.5% on the weight of the flour.

Standard formulations for yeast leavened rolls are virtually the same as those described for bread, the principal difference being the higher proportions of sugar and shortening.[4,5] Specifically, the proportion of sugar is within the range from 10 to 13%, whereas the proportion of fat or shortening is within the range from 6 to 8%, both on the weight of the flour.

4. "Mechanized Soft Roll Production—Hamburger Buns, Hot Dog Rolls and Parker House Rolls", by Harold Mykles, Proceedings of the American Society of Bakery Engineers, Mar. 5-8, 1951, Pages 201, 207.
5. "Bun Production By the Continuous Mixing Process", by George W. Trum, Proceedings of the American Society of Bakery Engineers, Mar. 8-10, 1971, Page 106-7.

In these standardized formulations, "sugar" is used in the usual sense of sucrose or dextrose (corn sugar). For various reasons as noted below, the standard white bread and roll formulations do not include lactose.

Commercial lactose, or milk sugar, is typically made by concentrating liquid whey from cheese-making to about 50% solids and then cooling to produce lactose crystals. The crystals are collected by centrifuging, washed, redissolved in water and then dried, or recrystalized to increase purity and dried. The resulting lactose is much less soluble than sucrose or dextrose, is not fermentable by baker's yeast (so as to contribute as a nutrient to the dough fermentation), and has only 15% the sweetening power of sucrose. Thus the use of lactose in bread or rolls, either as a sweetener or as pure carbohydrate, has been greatly limited.

It is worthy of note that lactose does find its way into yeast-leavened products, indirectly. Thus non-fat milk solids (50% lactose), and dried whey (75% lactose) are both well known ingredients in bread and rolls. However, bakers have had to overcome known loaf-volume depressing effects of these ingredients. Cereal chemists have evidence that lactose is a principal factor responsible for this loaf-volume depressing effect.[6] Consequently, lactose would seem to be very undesirable as a baking ingredient, particularly in white bread and roll formulations.

6. See "Use Of Whey In Baking", by E. J. Guy, Proceedings of Whey Products Conference, June 14–15, 1972, U.S. Department of Agriculture.

SUMMARY OF THE INVENTION AND OBJECTS

This invention relates to white bread and rolls of improved characteristics including significantly prolonged shelf life, and to processes for the manufacture of such products making use of lactose as a replacement for a substantial portion of the sugar and/or fat content in the dough mix.

In general, it is an object of the present invention to provide improved white pan bread and rolls of the above characteristics based on standard dough formulations wherein from 10 to 50% of the sugar and/or fat content of the dough mix is replaced with lactose.

It is a particular object of the invention to utilize such lactose replacement of sugar and fat in the dough formulations to obtain white pan bread and rolls characterized by significantly improved tenderness or "freshness" as represented by shelf lives at least 50 to 100% longer than normally obtained with the standard formulations.

Another object of the invention is to provide white bread and rolls of such character, based on substitution of lactose in the formula, which are of substantially improved quality as respects increased volume, improved external appearance, flavor and aroma.

Another object of the invention is to provide an improvement in the commercial processing of white pan bread and rolls, in which optimum dough and product characteristics are developed in a novel manner through lactose replacement of a substantial proportion of the sugar and fat content in regular or "standard" formulas.

As a general statement, the present invention is predicted on our discovery that lactose can be used to replace 10 to 50% of the sugar content (e.g., sucrose or dextrose) and/or the fat content (e.g., shortening) in standard dough formulations for producing white pan bread and rolls, with unexpected improvements in the tenderness and "freshness" of the resulting bread and roll products as represented by the previously noted significant prolongation of their shelf lives—viz., ranging up to 50 to 100% longer than normally encountered with products prepared from standard formulations for such products.

Specifically, we have found that as lactose is substituted for the sugar and/or fat content in white bread and roll formulas, the product initially becomes less tender. However, as the lactose level is increased to within the range of the 10 to 50% substitution of the present invention, the product becomes unexpectedly more tender as reflected by tenderness scores only ½ to ¾ those obtained with the standard formula breads. The result is a significant and unexpected increase in the bread's "freshness" or shelf life over a substantial period of time. Thus if the shelf life of the standard bread is normally two to three days, breads made with approximately 16 to 25% lactose substituted into the formulation will last 4 to 6 days—representing an extraordinary improvement in keeping quality. Substantial improvements in dough qualities, as reflected by improved workability and machining of the dough, and in baking qualities, as represented by significant increases in loaf volumes (10 to 15%) and in external appearance scores (5 to 15%) are also obtained. An additional benefit is flavor and aroma enhancement, apparently related to an ability of lactose to absorb flavors and aroma and color, and to retard their loss during processing and baking. The foregoing improvements are unexpected, not only because of the lack of sweetness and flavor and the unfermentable character of the lactose, but also because of an inherent lack of plasticity and known volume-depressing characteristic of the lactose ingredient, which would lead a worker in the art away from substituting lactose for either the sugar or the shortening content in the standard formulations.

Summarizing, we have specifically found that lactose is capable of functioning as a direct replacement for 10 to 50% of the sugar or fat in standard white bread and roll formulas to provide qualities which are generally more satisfactory than obtained with the standard dough formulations, and which are vastly and unexpectedly improved as respects the "freshness" or shelf life and tenderness of the final baked products. Moreover, when used as a replacement for the sugar and shortening in these standard bakery formulas, the separate components (sugar, shortening and lactose) apparently cooperate with one another to provide cumulative or synergistic effects which make possible the unusual and unexpected improvements in process and product characteristics described.

Other objects and features of the invention will appear from the following description, in which preferred embodiments are set forth, and from the drawings.

BRIEF DESCRIPTION OF THE DRAWINGS

FIG. 1 is a graph illustrating a particular advantageous feature of the present invention.

FIGS. 2, 3 and 4 are computer contour maps (related to three variables), illustrating further advantageous features of the present invention.

DESCRIPTION OF THE PREFERRED EMBODIMENTS

Sugar and fats play an important role in the production of virtually every type of bakery product. As previously noted, the sugar content in commercial white breads and rolls will range from a low of about 6% in bread to a high of about 13% in rolls, based on the weight of the flour. The fat or shortening content will range from about 2.5 to 3.5% in white pan bread to 6 to 8% in rolls, again on the weight of the flour. While the functions of sugar and shortening in standard bread and roll formulations are generally diverse, they are well known and considered extremely important to the commercial baker.

Sugar (sucrose) and corn sugar (dextrose) provide sweetening and flavoring while functioning as fermentable carbohydrates in the yeast cell generation of carbon dioxide, for leavening. Sucrose is obtained from sugar cane or sugar beets, and is by far the most important of the commercial sugars, being used in standard white bread formulations at levels ranging from about 6 to 10%. Such levels achieve accelerated fermentation rates as well as desired product characteristics related to crust color, volume, flavor-keeping qualities and the like. The use of fat or shortening in the standard formulation not only assists in mixing and dough handling but gives improved volume and keeping quality. In commercial leaven bread and rolls, the shortening contributes to the plasticity or lubrication of the dough to ensure film forming qualities for gas retention during proof and early bake, and to softness of the end product.

In general, there is little reason to replace sugar or shortening in the typical pan bread or roll formula. These ingredients not only are readily available from commercial sources, but are ideally suited to their intended purpose. As noted, sucrose or dextrose (individually, or mixed) are the common sugars. Lard or hydrogenated shortening are the common fats.

According to the present invention, dried lactose is substituted in standard formulations for white pan bread or rolls in portions equivalent to 10 to 50% of the formula content of sugar, corn sugar and/or shortening ingredients as referred to above. In this regard, "sugar" is used in the customary dictionary sense as defining a substance consisting entirely or essentially of sucrose, as derived principally from sugar cane and sugar beets, but also from sugar maple, sorghum and like sources. "Corn sugar" is also used in the dictionary sense of identifying specifically dextrose, although the substitution of lactose for corn syrup is clearly contemplated.

The terms "fat" and "shortening" as used herein are intended to cover the various commercially available shortenings, of animal and/or vegetable origin, as used in the bakery trade. Particular types of shortenings include lard, plastic animal and vegetable shortenings, plastic emulsified animal and vegetable shortening, plastic vegetable shortening, plastic emulsified vegetable shortening, and fluid aerating shortenings, among others.

According to the present invention, the lactose is incorporated into standard dough formulations for white pan bread or rolls in the manner of any dry subdivided material, such as non-fat milk solids, sugar or salt. Utility and effectiveness of the lactose substitution is indicated for such bread formulations specifying 6 to 10% sugar and 2.5 to 3.5% shortening, and in standard formulations for yeast leavened rolls specifying 10 to 13% sugar and 6 to 8% shortening. The indicated lactose substitution is effective for such formulations as used in the straight dough, sponge-dough, continuous and "no-time" dough procedures. In general, and assuming a standard formulation of essential dough ingredients including customary proportions of flour, water and leavening, and standard proportions of sugar and shortening as specified above, the improvement of the present invention comprises replacing from 10 to 50% of the weight of the sugar or shortening (or both) in the dough with lactose, followed by mixing the dough ingredients including the lactose component to form a dough, dividing the dough into units for baking and baking the units to provide bread and roll products having the significant and unexpected characteristics as respects enhanced tenderness or "freshness" and prolonged shelf life, as indicated herein, together with the improved characteristics as respects increased volume, external appearance, flavor and aroma.

With particular reference to the production of improved white pan breads and rolls in accordance with the present invention, typical generalized formulations are set forth in the following Table 2 in terms of standardized proportions of the essential ingredients in such formulations (flour, water and leavening), and in terms of optimal ranges of sugar, fat and replacement lactose. In this Table, the proportions of all ingredients are expressed as percentages of the flour.

TABLE 2

| BREAD AND ROLL FORMULAS USING LACTOSE | | |
|---|---|---|
| Component | Bread | Rolls |
| Flour | 100.0 | 100.0 |
| Water | 65.0 | 63.0 |
| Yeast | 3.0 | 3.5 |
| Yeast Food | 0.5 | — |
| Salt | 2.25 | 2.25 |
| Nonfat Milk | 3.0 | — |
| Sugar | 3.0–9.0 | 5.0–11.7 |
| Shortening | 1.2–3.5 | 3.0–7.2 |
| Lactose | 1.1–6.6 | 1.3–8.0 |

In the foregoing formulations, the indicated ranges for lactose, sugar and shortening are representative of a 10 to 50% substitution of lactose for the sugar and/or shortening content in standard bread and roll formulas. For example, in the above formulation for bread, the lowest value for sugar (3%) represents a 50% replacement by lactose at the lower level (viz., sugar content reduced from 6% to 3%), the lactose being added at a 2:1 ratio as respects the sugar. When lactose is used at its lowest level to replace only 10% of the highest sugar (viz., 10% in standard formula), the high sugar level is reduced from 10% to 9%. However, at a 2:1 replacement level, 2% lactose would be added to replace the 1% sugar removed—although less lactose could of course be used, as indicated in the table. A similar explanation applies to the formulation for rolls, except that in this typical formulation the lactose/sucrose replacement level is at a 1:1 ratio. In general, the lactose replacement of sugar and shortening in the foregoing standard formulations results in a modified content of sugar and shortening together with lactose in such formulations, consisting essentially of about 10% to 50% by weight replacement lactose, 20 to 65% sugar and 35% shortening.

The following examples are intended to be illustrative of the practice of the present invention and also of the substitution of lactose for 10 to 50% of the sugar and/or shortening content in dough formulations for commercial white pan bread and yeast leavened rolls. In these examples, all concentrations of ingredients are expressed as percent of the flour.

EXAMPLE 1

| | Dough Formulas - White Bread | |
|---|---|---|
| Ingredient | Standard Formula | With Lactose Substitution |
| Flour | 100.0 | 100.0 |
| Water | 65.0 | 65.0 |
| Yeast | 3.0 | 3.0 |
| Yeast Food | 0.5 | 0.5 |
| Emulsifier | 0.5 | 0.5 |
| Salt | 2.0 | 2.0 |
| Nonfat Dry Milk | 3.0 | 3.0 |
| Sugar (Sucrose) | 6.0–10.0 | 3.0–9.0 |
| Shortening | 3.0 | 1.5–2.7 |
| Lactose | — | 1.1–6.6 |

Procedures—Regular

1. Combine all dry ingredients and mix 1 minute at low speed.
2. Dissolve yeast in water, add yeast slurry to dry ingredients and mix 1 minute at low speed to form dough.
3. Mix dough to development at medium speed (about 8 minutes).
4. Ferment for 45 minutes in greased container.
5. Divide and round.
6. Proof (intermediate) for 10 minutes.
7. Mold.
8. Proof (final) for 60 minutes (105° F., 90% R.H.)
9. Bake at 400° F. for 20 minutes.

Procedure—With Lactose Substitution

The procedure is the same except that lactose is substituted for the sugar and shortening content of the dough within the indicated range of proportions, to provide three variables for purposes of evaluation (i.e., the levels of lactose, sucrose and shortening). The resulting baked breads are evaluated with respect to conventional standards (e.g., tenderness and shelf life, loaf volume and external appearance), for comparison with control breads made with the standard formulation, by the technique hereinafter described in the paragraph labelled "Results".

Results (a) Shelf Life (Example 2)

Within the indicated range of lactose substitutions, bread tenderness scores are recorded over a five day period with respect to a selected lactose-substituted white bread formula, in comparison with white bread prepared by the standard white bread formula of Example 1 (above), using the standard baker's compressimeter technique. Specific data and an analysis of the results are presented in the following Example 2, in conjunction with FIG. 1.

(b) Volume and External Appearance (Examples 3-5)

Comparative volumes and external appearance scores of the breads are recorded for a series of white breads using lactose substitutions within the indicated ranges, above, in comparison with white breads prepared by the standard white bread formula of Example 1, using the rape seed and American Institute Of Baking (A.I.B.) procedures, and the results presented by the response surface methodology (R.S.M.) technique.[7] According to this technique, the results are in the form of computer contour maps (i.e., the data is analyzed by computer and a model system generated and presented as contour lines). The data are presented in the following Examples 3–8 for three separate white pan bread formulations in conjunction with the contour maps of FIGS. 2 through 4.

7. "Cereal Science Today", :17, October 1972, Pages 309–315

EXAMPLE 2

"Freshness" And Shelf Life

White pan breads are prepared according to the standard formulation and procedure of Example 1, using 6% sucrose and 3% shortening in the formula. White pan breads are also prepared according to the process of the present invention, employing 4.5% sucrose, 3% lactose, and 2% shortening, and representing a ¼ reduction in sucrose and a ⅓ reduction in shortening. Compressimeter values as to tenderness are recorded over a five day period, as a measure of shelf life or "freshness". These values are plotted in FIG. 1 with tenderness (compressimeter) scores being plotted on the vertical axis and time (in days) on the horizontal axis.

Results

FIG. 1 shows that at one day the tenderness score (11.0) for the lactose-substituted bread is approximately ⅓ less than the score (17.5) for the standard formula. At two days, the value for the lactose-substituted bread is equal to the score for the standard formula bread at one day, representing a shelf life prolongation of 100%. Similar results are indicated for the lactose-substituted breads at three days, and at four days. Thus at four days, the tenderness value for the lactose substituted bread is equal to the value for the standard formula bread at two days, again representing a 100% prolongation of shelf life or "freshness".

EXAMPLES 3–5

Loaf Volume/External Appearance—No Fat Reduction

White breads are prepared according to the standard formulation and procedure of Example 1 using 6% sucrose and 3% shortening. Lactose substitutions are made according to the following table.

TABLE 3

| | Examples - Lactose Substitution For Sucrose | | | | |
|---|---|---|---|---|---|
| Example | % Substitution of Sugar | % Substitution of Fat | Actual Sugar | Actual Fat | Actual Lactose |
| 3 | 10 | 0 | 5.4 | 3.0 | 1.2 |
| 4 | 25 | 0 | 4.5 | 3.0 | 3 |
| 5 | 50 | 0 | 3.0 | 3.0 | 6 |

The foregoing table represents 10, 25 and 50% substitutions of lactose for sucrose, with the shortening being held at the normal 3% level. The resulting baked breads are evaluated by the rape seed displacement and American Institute Of Baking techniques for loaf volume and external appearance, and also for flavor and aroma.

Results

Loaf volumes are presented in the computer contour map of FIG. 2. Bread corresponding to Example 3 is found at point 10 on the map, with the loaf volume being greater than for the standard formula bread (2580 cm. compared to 2540 cm., or approximately a 2% increase). External appearance scores for the Example 2 bread are also improved.

Example 4 bread is found at point 12 on the contour map of FIG. 2, and is consistent with the highest or optimum bread volume as compared to the control (i.e., 2650 cm. compared to 2540 cm., or a 4% increase). External appearance scores are also substantially improved (33.0 as compared to 30.8).

The lactose-substituted bread of Example 5 is found at point 14 on FIG. 2. The volume is again somewhat greater than the standard formula bread (2580 cm. as compared to 2540 cm., or a 2% increase), whereas the external appearance scores are equivalent to those for standard bread. Thus the breads of Examples 3 and 5 (representing 10 and 50% lactose replacements, respectively) are substantially equivalent, and both are equal or better than the standard bread. The bread of Example 4 (corresponding to a 25% lactose replacement) is superior bread, having substantially improved characteristics as respects the standard formula bread.

Summarizing, FIG. 2 shows loaf volume responses at various levels of substitution of lactose for sucrose, with shortening being held constant at the level in the standard formula. The far upper left hand corner of the figure thus represents the standard bread. The contour map shows that as lactose is added, the bread volume increases, as represented by the Example 3 and 4 breads. However, a point is eventually reached where additional lactose will cause a decrease in the loaf volume, as represented by lactose substitutions greater than the 50% substitution of the Example 5 bread. In general, it is very apparent that within the indicated range, optimum loaf volumes can be obtained by decreasing the level of sucrose and adding lactose. The relationship is not a 1:1 replacement of sugar with lactose, but is closer to a 2:1 replacement ratio. As shown in FIG. 2, superior breads are produced by replacing 16–25% of the sucrose in standard bread formulations with approximately twice its weight in lactose. In this regard, all of the lactose-substituted breads exhibit improved characteristics as respects flavor enhancement, aroma and color. Lactose is known as an excellent absorbant and has been used as a carrier for flavors, aromas and/or color in other applications. In the lactose-substituted breads and rolls of the present application, this function of lactose can be used to accentuate and maintain flavor, color and aroma and to retard their loss during processing and baking.

EXAMPLES 6–8

Loaf Volume/External Appearance—Fat Reduced 33%

White breads are again prepared according to the standard formulation and procedure of Example 1, using 6% sucrose and 2% shortening. Lactose substitutions are made according to the following table.

TABLE 4

| | Examples - Lactose Substitution For Sucrose And Fat | | | | |
|---|---|---|---|---|---|
| Example | % Substitution of Sugar | % Substitution of Fat | Actual Sugar | Actual Fat | Actual Lactose |
| 6 | 10 | 33 | 5.4 | 2.0 | 1.2 |
| 7 | 25 | 33 | 4.5 | 2.0 | 3 |
| 8 | 50 | 33 | 3.0 | 2.0 | 6 |

Examples 6, 7 and 8 represent 10, 25 and 50% substitutions of lactose for sucrose and fat, respectively, with the shortening being held at two-thirds the normal at 2%. The baked breads are evaluated by the rape seed displacement and American Institute of Baking techniques for loaf volume and external appearance, and also for flavor and aroma.

The similarity of the computer contour map of FIG. 3 with that of FIG. 2, shows that the pattern of increasing loaf volumes at varying lactose substitutions is relatively unchanged, when the lactose is substituted for both sucrose and shortening. Thus the breads corresponding to Examples 6 and 8, found at points 16 and 20 on FIG. 3, are comparable to the breads of Examples 3 and 5 previously described. Similarly, the bread of Example 7 found at point 18 on FIG. 3 (corresponding to a 25% lactose replacement of sucrose and fat) is a bread of superior characteristics corresponding to the bread of Example 4. Again, the volume of this bread is substantially greater than the volume of the standard formula bread (2650 cm. as compared to 2550 cm.) and external appearance scores are somewhat higher. FIG. 3 again shows fat, at substitutions above 10%, as lactose is added the bread volume increases. Such increase in volume increases with lactose substitution until the 50% substitution level is reached, as indicated by the bread of Example 8 (0.20 in FIG. 3). In general, the computer map of FIG. 3 shows that lactose can be successfully substituted for sugar and fat, within a range of a 10—50% replacement of these ingredients, with an optimum level being indicated when approximately 16 to 25% of the sucrose is replaced by two times its weight of lactose, the shortening being reduced by one third.

The computer contour map of FIG. 4 relates to external appearance scores of the breads of Examples 6, 7 and 8 (plotted at points 22, 24 and 26, respectively, in FIG. 4). In general, FIG. 4 shows that the appearance scores were significantly improved, even when the shortening level was reduced by one third. Highest scores are observed at this reduced level of shortening when about 16 to 25% of the sucrose is replaced with approximately twice its weight in lactose. In this regard, the scores for external appearance are in line with and confirm the indications with respect to increased loaf volumes as obtained by means of lactose replacement.

Work with different bread formulations further confirms the foregoing patterns and ranges. Thus if the proportion of shortening is reduced below 50% (for example by 66%), there is an overall deterioration in external appearance and a decrease of loaf volume to barely acceptable values. Still, the substitution of lactose in such circumstances helps to improve the values, thus confirming the concept.

EXAMPLE 9

| Ingredient | Dough Formula - Hot Dog Buns | |
|---|---|---|
| | Standard Formula | With Lactose Substitution |
| Flour | 100.0 | 100.0 |
| Water | 66.0 | 66.0 |
| Yeast | 5.5 | 5.5 |
| Yeast Food | (1.0) | 1.0 |
| Emulsifier | 2.0 | 2.0 |
| Salt | 2.0 | 2.0 |
| Nonfat Dry Milk | 3.0 | 3.0 |
| Sugar (Sucrose) | 10.0–13.0 | 5.0–11.7 |
| Shortening (Lard) | 6.0–8.0 | 3.0–7.2 |
| Lactose | — | 1.3–8.0 |

Procedure—Regular

1. Combine all ingredients and mix 2½ minutes at low speed on low speed Read horizontal bread mixer.
2. Mix dough to development at high speed, approximately 12 minutes.
3. Transfer dough directly to Readco vacuum bun divider-rounder.
4. Divide.
5. Immediately mould on a Thompson hot-dog molder.
6. Proof and bake, according to conventional procedure.

Procedure—With Lactose Substitution

The procedure is the same except that lactose is substituted for the sugar and shortening content of the dough, within the indicated range of proportions. The resulting baked buns are evaluated with respect to conventional quality standards, e.g. tenderness and shelf life, loaf volume and external appearance, for purposes of comparison with the control buns made with the standard formulation.

Results

Comparative volumes and external appearance scores are similar to those obtained with the white breads, in that values based on a 10 to 50% substitution of lactose for sugar and shortening are at least equivalent to those obtained with the standard formula buns, with substantially improved scores being indicated at an optimum level of 16 to 25% replacement of sucrose with lactose, with equal or ⅓ reduction in the shortening level. Very significant improvements in tenderness scores are also indicated over prolonged periods of time.

In a commercial bake run at an independent bakery, hot dog buns and hamburger buns made with lactose replacement of 25% of the sucrose and 33% of the shortening, were considered as fresh after four days as standard formula buns evaluated the day after baking. This commercial bake test reflects an extension of "freshness" or shelf life of the products on the order of 300%, as compared to the standard formula products.

What is claimed is:

1. In a process for preserving the freshness of white pan bread or rolls for prolonged periods of time while simultaneously maintaining and improving volume, appearance and other desired characteristics of said products, said process employing standard formulations of essential dough ingredients including flour, water, leavening, 6 to 13% sugar and 2.5 to 8% shortening on the weight of the flour, the improvement comprising the steps of employing lactose as a replacement for 10 to 50% by weight of the sugar content and 10 to 50% by weight of the shortening content in such a standard formulation, thereafter mixing the formula ingredients including said replacement lactose to form a dough, dividing the dough into units for baking, and baking said units to provide white pan bread and rolls which exhibit desired characteristics of "freshness" for periods of time at least 50 to 100% longer than white pan bread and rolls prepared with said standard formulation without said replacement lactose, and which also exhibit substantially increased volumes and improved external appearance scores as compared to said standard formulation bread and rolls.

2. A process as in claim 1 wherein corn sugar forms part of the sugar content of said standard formulation and said lactose replaces at least 10 to 50% of said corn sugar.

3. In a process for preserving the freshness of white pan bread for prolonged periods of time while simultaneously maintaining and improving volume, appearance and other desired characteristics of said products, said process employing standard formulations of essential dough ingredients including flour, water, leavening, 6 to 13% sugar and 2.5 to 8% shortening on the weight of the flour, the improvement comprising the steps of employing lactose as a replacement for 10 to 50% of the weight of the sugar content and for 10 to 50% of the weight of the shortening content in said standard formulation, thereafter mixing the formula ingredients including said replacement lactose to form a dough, dividing the dough into units for baking, and baking said units to provide white pan bread which exhibit desired characteristics of "freshness" for periods of time at least 50 to 100% than white pan bread prepared with said standard formulation without said replacement lactose, and which also exhibits substantially increased volumes and improved external appearance scores as compared to said standard formulation bread.

4. In a process for preserving the freshness of yeast leavened rolls for prolonged periods of time while simultaneously maintaining and improving volume, appearance and other desired characteristics of said rolls, said process employing standard formulations of essential dough ingredients including flour, water and leavening, 10 to 13% sugar and 6 to 8% shortening on the weight of the flour, the improvement comprising the steps of employing lactose as a replacement for 10 to 50% of the weight of the sugar content and for 10 to 50% of the shortening content in said standard formulation, thereafter mixing the formula ingredients including said replacement lactose to form a dough, dividing the dough into units for baking, and baking said units to provide yeast leavened rolls which exhibit desired characteristics of "freshness" for periods of time at least 50 to 100% longer than yeast leavened rolls prepared with said standard formulation without said replacement lactose, and which also exhibits substantially increased volumes and improved external appearance scores as compared to said standard formulation rolls.

5. A white pan bread or roll composition produced by the process of claim 1.

* * * * *